April 13, 1926.
H. E. IVES
PICTURE ANALYSIS
Filed Dec. 27, 1923
1,580,896
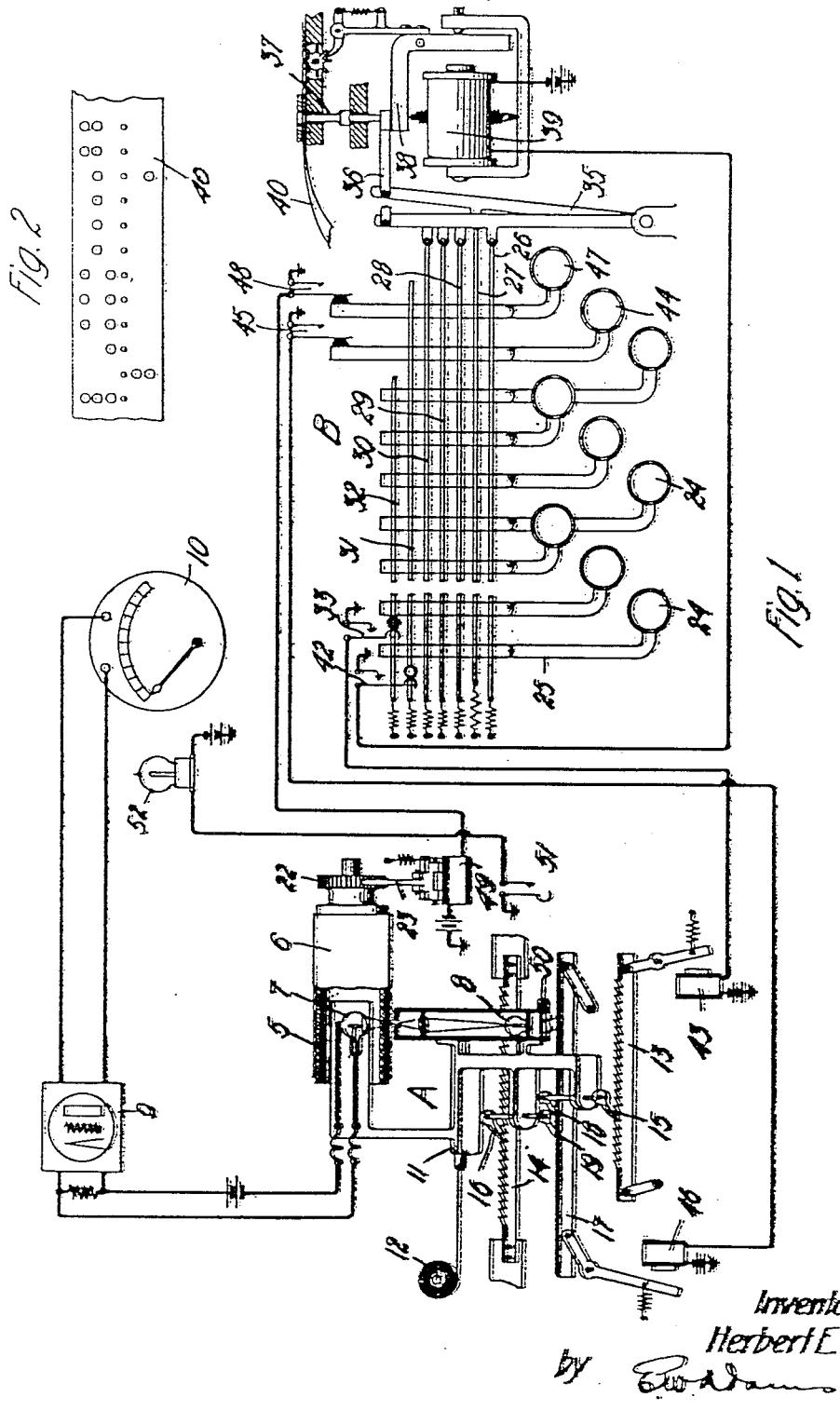
Inventor:
Herbert E. Ives
by [signature] Atty Patented Apr. 13, 1926.

1,580,896

UNITED STATES PATENT OFFICE.

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK.

PICTURE ANALYSIS.

Application filed December 27, 1923. Serial No. 682,869.

*To all whom it may concern:*

Be it known that I, HERBERT E. IVES, a citizen of the United States of America, residing at Montclair, in the county of Essex and State of New Jersey, have invented certain new and useful Improvements in Picture Analysis, of which the following is a full, clear, concise, and exact description.

This invention relates to the transmission of pictures and the like by electricity and more particularly to apparatus for use in connection with the reduction of the tone values to records.

An object of the invention is to facilitate and expedite the analysis of an original picture, which is desired to be transmitted by electricity. Other objects will be apparent from the following description.

In accordance with the main object of the invention means are provided for making an examination of the tone values of a picture by the use of a photo-electric cell which is designed to be moved relatively to a picture to be analyzed and which controls in accordance with the density of the picture a galvanometer or other suitable indicating instrument for indicating the proper tone value. An operator by observing the deflections of the indicating instrument may cause the perforation of a tape in accordance with symbols characteristic of the tone value indicated by the indicating instrument. The tape may then be passed through a telegraph transmitter for transmitting signal impulses in accordance with the perforations therein resulting in the production of a record of such tone values, for causing the operation of a receiving printer which will reproduce the original picture.

A better understanding of the invention may be had from the following description, taken in conjunction with the accompanying drawing, in which one embodiment of the invention is illustrated diagrammatically in Fig. 1 and Fig. 2 shows a sample of the perforated tape.

Referring now to Fig. 1 of the drawing, there is shown a mechanism A which functions as will be described later to cause the operation of an indicating instrument in accordance with the tone values of a picture to be analyzed and a perforating mechanism B operative to perforate a tape in accordance with the tone values indicated on the indicating instrument.

The mechanism A comprises a transparent drum 5 around which a picture 6, preferably in the form of a transparent film is wound. Located within the transparent drum 5 is a photo-electric cell 7 which is adapted to be positioned in the path of a beam of light from a light source 8. The photo-electric cell 7 is connected by suitable connections through amplifying means 9 to a quick-acting instrument such as a string galvanometer or other sensitive indicating instrument 10. The photo-electric cell 7 and the source of light 8 are mounted on a carriage 11 which is adapted to be moved relatively to the film 6. It is of course obvious that the photo-electric cell as well as the source of light could be made stationary while the film 6 may be moved with respect to the photo-electric cell and still provide equally good results.

Inasmuch as it is desired to advance the carriage 11 following the operation of the perforator mechanism B, mechanism for accomplishing this feature is arranged to be operated upon each operation of the perforator mechanism B, except two particular operations, viz, the carriage return and the line feed operations, as will be later explained. This mechanism comprises a pair of toothed racks 13 and 14, one of which is adapted to reciprocate while the other is made stationary. These racks are positioned just below the carriage 11 and are adapted to be engaged by pawls 15 and 16, respectively, carried by suitable rods rotatably supported in the carriage 11. The mechanism for moving the rack 13 and for causing a corresponding movement of the carriage 11 comprises a lever secured to the armature of an electromagnet 43 which is controlled from the perforator mechanism. Upon each operation of the electromagnet the toothed rack 13 will be moved to the right. For each full movement of rack 13 the carriage 11 will be stepped to the right owing to the engagement of pawl 15 carried by the carriage 11 with the teeth of this rack a distance sufficient to allow pawl 16 to engage the next succeeding tooth in rack 14. Now upon the deenergization of the electromagnet the rack 13 will be restored to normal by a spring but the carriage 11 will remain in the new position owing to the engagement of pawl 16 with a tooth in the stationary rack 14.

The carriage 11 is moved from left to right under the tension of a carriage return spring 12. The carriage return spring 12 has one end fastened to the frame of the machine (not shown) while its other end is secured to carriage 11 so that for each movement of the carriage 11 greater tension is placed on the carriage return spring 12. When it is desired to return the carriage 11 to its normal position it is necessary to disengage pawls 15 and 16 from their associated racks thereby allowing the energy stored in spring 12 to restore the carriage 11 to its normal position. This mechanism will now be described.

Interposed between the racks 13 and 14 is a bar 17 on which rests a pair of operating members 18 and 19 which are connected with the rods to which the pawls 15 and 16 engaging the racks 13 and 14 are connected. The carriage 11 may be restored to its normal or extreme left hand position upon the energization of a magnet 46 which causes the bar 17 to be lifted sufficiently to cause the disengagement of the pawls 15 and 16 from the racks 13 and 14 and, in consequence, the restoration of the carriage 11 to its extreme left hand position due to the action of spring 12.

It is also necessary that the drum 5 together with the film 6 be rotated for bringing another line of the film in the path of the light beam. For accomplishing this feature, the drum 5 has secured thereto a ratchet wheel 22 which is adapted to be engaged by a stepping pawl 23, in turn operated by an electromagnet 49.

The perforating mechanism B comprises a plurality of character keys 24 which are provided with operating levers 25. Extending transversely of the operating levers 25 are a plurality of selecting elements 26, 27, 28, 29, 30, 31 and 32. The first five of the enumerated elements serve to control the position of pivoted levers 35 each of which has secured to its free end a member 36. Each of the elements 26 to 30 is arranged with respect to the operating levers 25 such that they will be moved in various combinations in accordance with the depression of the character keys 24. However, the selecting elements 31 and 32 are so arranged that element 31 is moved upon the depression of any one of the character keys while element 32 is selected on the depression of all of the keys excepting the carriage return and line feed keys, the purpose of which will be explained later. The members 36 are adapted to be moved between punch pins 37 (there being one for each of the members 36 as well as a feed hole punch pin as is well known by those familiar with such perforators), and a hammer 38 which is adapted to be operated upon the energization of an electromagnet 39 for causing the punch pins 37 to perforate a tape 40. Mechanism is also provided for causing the advancement of the tape 40 upon each energization of the magnet 39 for bringing an unperforated area in alignment with the punch pins 37. Associated with the selecting element 31 is a contact making member 42 which closes a contact upon the depression of any one of the character keys for causing the energization of the punch magnet 39. Also when the character keys excepting the carriage return and the feed keys are depressed a circuit is completed for magnet 43. The magnet 43 cooperates with the rack 13 for causing the advancement of the carriage 11 upon the depression of the character keys thereby bringing the photo-electric cell and the light source 8 in line with the next area of the picture.

It is also necessary in addition to the perforation of the tape 40 in accordance with the line feed and carriage return operations to perform such operations on the analyzing mechanism A. Accordingly, there is associated with key 44 which may be allotted to the carriage return operation a contact member 45 serving upon the depression of key 44 to close its associated contact and cause the energization of magnet 46. This magnet 46 has its armature connected with the rack 17 so that upon its energization the rack 17, is lifted, thereby causing the disengagement of the pawls 15 and 16 from the teeth of both the racks 13 and 14 and, in consequence, the restoration of the carriage 11 to its normal position, due to the action of spring 12. Likewise, associated with key 47, the key designated as the line feed key, is an operating member 48 which functions to close a contact for completing an energizing circuit for magnet 49. The magnet 49 has its armature connected to pawl 23 so that upon each operation of the magnet 49, the pawl 23 is caused to engage the next succeeding tooth in the ratchet wheel 22. Upon the deenergization of magnet 49, the ratchet wheel 22 together with the drum 5 will be rotated a distance equal to the space between two teeth in the ratchet wheel 22.

The operation of the perforator mechanism B per se is identical with that shown in patent to Pfannenstiehl, No. 1,533,206, granted April 14, 1925. Further detail description thereof is therefore unnecessary.

In order that the operator will be advised when the end of a line is approached, a projection 50 is arranged on the carriage 11. This projection, when the carriage is in its right hand position, engages an operating member 51 which completes an energizing circuit for a lamp 52. The operation of the lamp 52 serves as an indication to the operator that the carriage 11 has reached the end of the line at which time the carriage return key 44 should be operated for perforating the tape 40 in accordance with the carriage return signal as well as causing the energization of magnet 46 and the restoration of the carriage 11 to its left hand position. Following the depression of the carriage return key 44, line feed key 47 should be depressed. Consequently, the tape 40 will be perforated as shown in Fig. 2 in accordance with the signals designating this particular operation and a circuit completed for magnet 49 which, in turn, causes the rotation of the drum 5 for bringing the next line of the film 6 in the path of the light beam.

Assume now that it is desired to examine or analyze a picture which is preferably in the form of a transparent film. The carriage 11 of the mechanism A will be in the extreme left hand position at the uppermost part of the picture to be analyzed. The photo-electric cell 7 will thus be in the path of the light beam and will respond in accordance with the density of the particular area of the film. Accordingly, the galvanometer 10 will be operated to indicate to the operator the density of that particular part of the film. The scale of the galvanometer 10 may be divided into blocks of some predetermined number which is determined by reference to the fineness of the tone reproduction which is ultimately desired. The position of the needle or other indicating means will immediately show which character signal is to be chosen.

Assume for the purpose of illustration that the total range of deflection is 10 inches and that the needle is only $\frac{1}{10}$ inch or $\frac{1}{20}$ inch in size so as to be of negligible width. If now, we divide the scale into two blocks, then for any position of the needle in the first block, the first signal is indicated, and for any position in the second block, a second signal is indicated. Consequently, the operator or observer would cause the depression of a character key 24 to perforate the tape 40 to correspond to these particular densities. The depression of the character key 24 as previously described, would cause the operation of the punch magnet 39 and the energization of magnet 43 which causes the perforation of the tape and the advancement of the carriage 11 to bring the light source 8 and the photo-electric cell 7 to the next area of the film 6. The scale of the galvanometer 10 may be divided into any number of blocks as determined by the fineness of the reproduction desired. Each of the blocks may bear some designating label for expediting the examination of the picture, that is, the blocks may be labeled numerically. Thus, when the needle is deflected to a certain block, the operator will at once know which of the character keys 24 should be depressed for causing the perforation of the tape in accordance with this particular density.

After the tape 40 has been perforated in accordance with perforations designating the particular tone values of the picture, it may then be run through a printing telegraph transmitter for transmitting to a distant station code combinations of message impulses. These impulses, upon being received at the distant station, control the operation of receiving mechanism for reproducing the original picture. The receiving mechanism may be the usual printing telegraph receiver in which the carriage is moved from left to right step by step or by the use of a receiving mechanism in which a spiral movement is imparted to the carriage. Also, other kinds of movements may be employed with equally good results.

Although the invention has been disclosed and described with reference to a particular structure, it is of course obvious that various modifications may be made without departing from the spirit and scope of the present invention.

What is claimed is:

1. In the picture analyzing system, picture holding means, a device operable in accordance with the tone values of elements of the picture, means operable in response to said device for indicating the tone values of said picture elements, means for recording said tone values, and means responsive to said recording means to cause relative movement between said device and said picture holding means.

2. In a picture analyzing system, means for holding a picture to be analyzed, a source of radiant energy, a radiant energy sensitive device operative in accordance with the different tone values of the picture, an indicating instrument responsive to the operation of said radiant energy sensitive device for indicating the tone values of the picture, means by which an observer may make a record of such tone values, and means controlled by said means for causing relative movement between said radiant energy sensitive device and said picture holding means.

3. In a picture analyzing system, means for holding a picture to be analyzed, a radiant energy sensitive device operated in accordance with the different tone values of the picture, an indicating instrument responsive to the operation of the radiant energy sensitive device, a perforator operated by an observer to perforate a tape in accordance with the tone values indicated by said instrument, and means controlled by said perforator for causing the relative movement between said picture holding means and said radiant energy sensitive device.

4. In a picture analyzing system, means for holding a picture to be analyzed, a radiant energy sensitive device operated in accordance with the different tone values of the picture, an indicating instrument responsive to the operation of the radiant energy sensitive device, a perforator operated by an observer in accordance with the indications of said instrument comprising a plurality of key levers, selecting elements operated thereby in various combinations, and means responsive to the movement of said selecting elements for perforating said tape in accordance with the tone values indicated by said instrument and for causing the movement of said radiant energy sensitive device relative to the picture holding means.

5. In a picture analyzing system, means for holding a picture to be analyzed, a radiant energy sensitive device operated in accordance with the different tone values of the picture, a movable carriage for supporting said device, an indicating instrument responsive to the operation of the radiant energy sensitive device, a perforator operated by an observer in accordance with the indications of said instrument comprising a plurality of key levers, selecting elements operated in various combinations, and means responsive to the movement of said selecting elements for perforating said tape in accordance with the tone values indicated by said instrument and for causing the movement of said carriage together with said radiant energy sensitive device relative to the picture holding means.

6. In a picture analyzing system, means for holding a picture to be analyzed, a radiant energy sensitive device operated in accordance with the different tone values of the picture, a carriage for carrying said device, an indicating instrument responsive to the operation of the radiant energy sensitive device, means for advancing said carriage step-by-step, a perforator operated by an observer in accordance with the indications of said instrument comprising a plurality of key levers, selecting elements operated thereby in various combinations, means responsive to the movement of said selecting elements for perforating said tape in accordance with the tone values indicated by said instrument and for causing the operation of said carriage advancing means for advancing said carriage together with said radiant energy sensitive device.

7. In a picture analyzing system, means for holding a picture to be analyzed, a radiant energy sensitive device operated in accordance with the different tone values of the picture, a carriage for carrying said device, an indicating instrument responsive to the operation of the radiant energy sensitive device, means for advancing said carriage step by step, means for restoring said carriage to its normal position, a perforator operated by an observer in accordance with the indications of said instrument comprising a plurality of key levers, selecting elements operated thereby in various combinations, means responsive to the movement of said selecting elements for perforating said tape in accordance with the tone values indicated by said instrument and for causing the advancement of said carriage advancing means, and means controlled by the depression of a certain key lever for causing the operation of said carriage restoring means.

8. In a picture analyzing system, picture holding means, a device operable in accordance with the tone values of successive elements of the picture, means responsive to said device for indicating tone values of said picture elements, keys for making a record of said tone values, and means controlled by said recording keys for causing relative movement between said device and said picture holding means.

In witness whereof, I hereunto subscribe my name this 26 day of December A. D., 1923.

HERBERT E. IVES.